US007126901B2

(12) United States Patent
Iwasaki et al.

(10) Patent No.: US 7,126,901 B2
(45) Date of Patent: Oct. 24, 2006

(54) DEVICE AND UNIT FOR CORRECTING ABERRATION OF LIGHT BEAM

(75) Inventors: Masayuki Iwasaki, Tsurugashima (JP); Makoto Sato, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 555 days.

(21) Appl. No.: 10/686,283

(22) Filed: Oct. 15, 2003

(65) Prior Publication Data

US 2004/0170107 A1   Sep. 2, 2004

(30) Foreign Application Priority Data

Oct. 18, 2002   (JP)   ............................ P2002-304713

(51) Int. Cl.
*G11B 7/00*   (2006.01)
(52) U.S. Cl. ................................ 369/112.02; 369/44.32
(58) Field of Classification Search ........... 369/112.02, 369/44.32
See application file for complete search history.

(56) References Cited

U.S. PATENT DOCUMENTS 6,859,429 B1 *   2/2005   Ogasawara et al. ..... 369/112.02
7,020,055 B1 *   3/2006   Kim et al. ............... 369/44.41

FOREIGN PATENT DOCUMENTS

JP          09-128785          5/1997

* cited by examiner

*Primary Examiner*—Gautam R. Patel
(74) *Attorney, Agent, or Firm*—Drinker Biddle & Reath LLP

(57) ABSTRACT

An aberration correcting unit is provided for correcting an aberration of a light beam radiated onto an object to be detected and then reflected from the object. This unit comprises an aberration correcting device comprising a first corrector configured to correct the aberration of the light beam radiated onto the object; and a second corrector configured to correct the aberration of the light beam reflected from the object and to divide the reflected light beam into a plurality of light beams. The aberration correcting unit further comprises a first driver configured to drive the first corrector and a second driver configured to drive the second corrector.

15 Claims, 18 Drawing Sheets

DEVICE AND UNIT FOR CORRECTING ABERRATION OF LIGHT BEAM

BACKGROUND OF THE INVENTION

1. The Field of the Invention

The present invention relates to correction of an aberration of a light beam used for reading and writing bits of information from and onto a recording medium.

2. Description of the Related Art

In a pickup placed in front of an optical disk, a liquid crystal layer has been used as one of conventional countermeasures for correcting aberration of a light beam, as disclosed by Japanese Patent Laid-open (KOKAI) No. 9 (1997)-128785.

This correcting technique is illustrated in FIGS. 1A and 1B. As shown in FIG. 1A, a liquid crystal layer 2 is placed in front of an objective lens 1 in order to obtain a high-quality spot on an optical disk DK1. The liquid crystal layer 2 is in charge of generating an appropriate optical phase distribution for canceling an aberration of light caused by both the objective lens d and the disk DK1. Since the liquid crystal layer 2 becomes active when a linearly polarized light in a particular direction enters the layer 2, the incident light should be linearly polarized in the particular direction (in this explanation, such linearly polarized light is referred to as s-polarized light). To obtain a linearly polarized light spot on the optical disk DK 1, the optical configuration shown in FIG. 1A is provided.

By contrast, if a circularly polarized spot on an optical disk is required, the optical configuration shown in FIG. 1B is provided, in which a quarter wave plate 6 to convert linearly polarized light to circularly polarized light is arranged additionally to the configuration shown in FIG. 1A.

In this optical configuration shown in 1B, the returning light from an optical disk DK2 has a polarizing direction perpendicular to that of the incident light (such polarized light is referred to as p-polarized light). To make the liquid crystal layer operative as aberration correcting means in the outward and homeward optical paths, it is required, as shown in FIG. 1B, two liquid crystal layers consisting of a liquid crystal layer 4 for s-polarized light and a further crystal layer 5 for s-polarized light. Only a difference between the two liquid crystal layers 4 and 5 is the direction of orientation of liquid crystal molecules. That is, the direction of orientation of liquid crystal molecules within one liquid crystal layer 4 is perpendicular to that within the other liquid crystal layer 5. However, the operations of both the liquid crystal layers 4 and 5 are almost similar to each other, thus being in charge of creating an approximately identical phase distribution.

For a DVD (Digital Versatile Disc) and a next-generation high-density disk, it has been recognized that the circularly polarized optical spot on a disk is desired to obtain an excellent playablity. Hence if such a optical spot is desired, it is required to choose the optical configuration shown in FIG. 1B.

By the way, a conventional optical pickup uses a technique of dividing a returning light beam from a disk into a plurality of light beams. This division of the returning light beam is needed to obtain means for avoiding a tracking offset.

In cases where the tracking control is performed on a push-pull technique on condition that a beam spot is divided into several spot pieces on a detector, a tracking offset will be caused due to eccentricity of an objective lens. The light beam is divided into two light fluxes at a spot on the objective lens and the light fluxes are detected by respective detectors, so that no tracking offset will be caused.

In addition, when a DPD (Differential Phase Detection) tracking technique is used, it has been known that a tilt of a disk in its tangential direction causes a tracking offset. This kind of tracking offset can be removed by dividing a light beam into four light beams at a spot on an objective lens.

However, the aberration correcting means shown in FIG. 1B uses the two liquid crystal layers 4 and 5 which operate in the same manner. That is, the liquid crystal layers 4 and 5 are dedicated to only a limited operation that gives the same phase distribution to both of the outward and homeward light beams, as follows. Light irradiated from a light source enters the liquid crystal layer 5 in the form of parallel light beams, while the light returning from the optical disk DK2 enters the liquid crystal layer 6. As a result, the light that has passed the liquid crystal layers 5 and 6 is returned to parallel-beam light beams, which is the same as the incident light.

Hence, as means for dividing the returning light from the optical disk into plural light beams, a polarizing hologram has been used additionally.

However, such a manner is obliged to add one more optical part to the optical system in which the two liquid crystal panels have already been arranged. This has faced an obstacle that the pickup becomes larger in its size and higher in its production cost.

SUMMARY OF THE INVENTION

An object of the present invention is to provide, with due consideration to the difficulties of the above conventional technique, an aberration correcting device, aberration correcting unit, optical pickup, and aberration correcting method, which are able to divide a light beam returning from an optical disk into a plurality of optical beams without using any additional optical parts, while sill correcting an aberration which will be caused in the light beam passing an optical pickup.

According to one aspect of the present invention, there is provided an aberration correcting device used by an aberration correcting unit for correcting an aberration of a light beam radiated onto an object to be detected and then reflected from the object, the aberration correcting device comprising: a first corrector configured to correct the aberration of the light beam radiated onto the object; and a second corrector configured to correct the aberration of the light beam reflected from the object and to divide the reflected light beam into a plurality of light beams.

Preferably, each of the first and second correctors comprises a refraction index changing element configured to change a refraction index in response to a voltage to be applied thereto; and an electrode configured to apply the voltage to the refraction index changing element to correct the aberration.

Still preferably, the electrode of each of the first and second correctors is divided into at least two electrode segments to form an electrode pattern so that the electrode pattern gives the light beam a phase distribution, wherein the phase distribution given by the electrode pattern of the second corrector is formed by superposing, one on the other, a first phase distribution to correct the aberration of the light beam reflected from the object and a second phase distribution to divide the reflected light beam into the plurality of light beams.

It is preferred that the first and second correctors are composed of first and second liquid crystal elements, respectively. By way of example, both of the first and second liquid crystal elements are formed into one element with an intermediate substrate used in common. Still, by way of example, the second liquid crystal element is composed of a first liquid crystal panel of which electrode pattern gives the first phase distribution and a second liquid crystal panel of which electrode pattern gives the second phase distribution.

It is also preferred that the first liquid crystal element is arranged to orient light in accordance with a polarized direction of the light beam radiated onto the object and the second liquid crystal element is arranged to orient light in accordance with a polarized direction of the light beam reflected from the object.

As another aspect of the present invention, there is provided an aberration correcting unit for correcting an aberration of a light beam radiated onto an object to be detected and then reflected from the object, the aberration correcting unit comprising: an aberration correcting device comprising a first corrector configured to correct the aberration of the light beam radiated onto the object; and a second corrector configured to correct the aberration of the light beam reflected from the object and to divide the reflected light beam into a plurality of light beams; a first driver configured to drive the first corrector; and a second driver configured to drive the second corrector.

Furthermore, as another aspect of the present invention, there is provided an optical pickup reading or writing bits of information from or onto an optical recording medium by radiating a light beam onto the recording medium and receiving the light beam reflected from the recording medium, comprising: a first corrector configured to correct an aberration of the light beam radiated onto the recording medium; and a second corrector configured to correct an aberration of the light beam reflected from the recording medium and to divide the reflected light beam into a plurality of light beams.

Still, as another aspect of the present invention, there is provided an aberration correcting method for correcting an aberration of a light beam radiated onto an object to be detected and then reflected from the object, the method comprising the steps of: driving a first driver; first correcting the aberration of the light beam radiated onto the object by using the first driver that has been driven; driving a second driver; and second correcting the aberration of the light beam reflected from the object and to divide the reflected light beam into a plurality of light beams by using the second driver that has been driven.

BRIEF DESCRIPTION OF THE DRAWINGS

Other objects and aspects of the present invention will become apparent from the following description of embodiments with reference to the accompanying drawings in which.

DETAILED DESCRIPTION OF PREFERRED EMBODIMENTS

Preferred embodiments of the present invention will now be described hereinafter with reference to the accompanying drawings. In the following embodiments, an optical pickup will be explained, to which the present invention is applied. The optical pickup, which radiates a light beam onto an optical disk serving as an object to be detected, is equipped with an aberration correcting unit in order to correct aberration of the light beam.

(First Embodiment)

A first embodiment of the present invention will now be described.

At first, referring to FIG. 2, the configuration of an optical pickup according to the present embodiment will now be described.

Figures 1A, 1B:
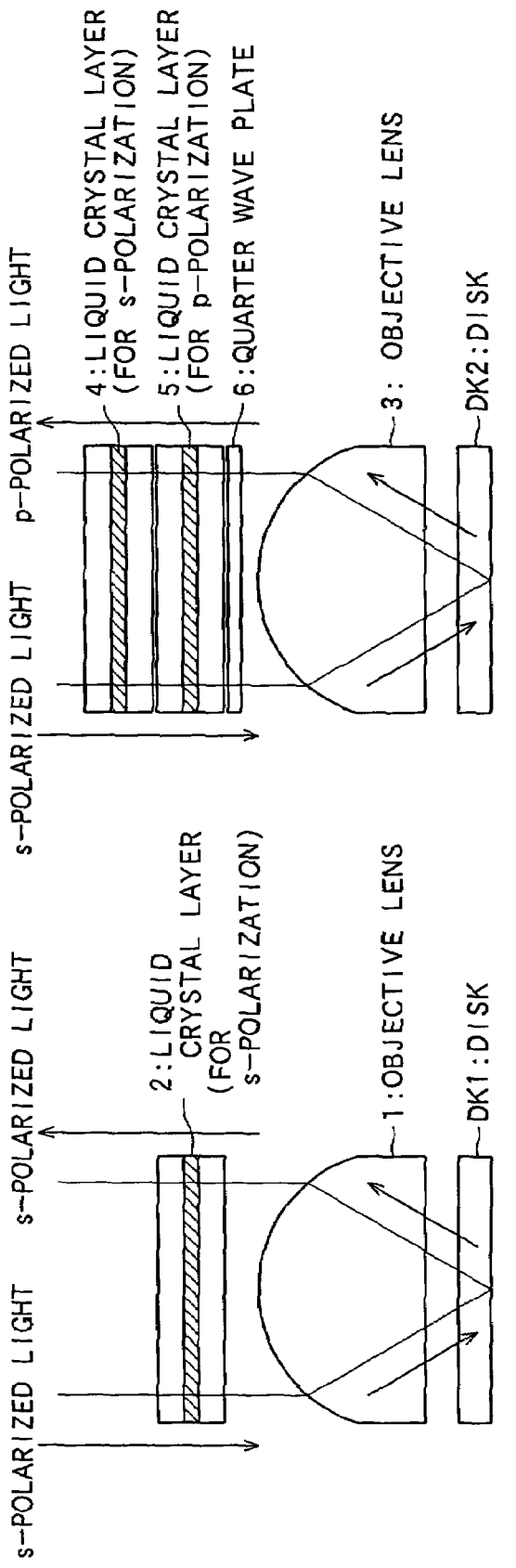
FIGS. 1A and 1B are illustrations each a showing conventional technique for correcting an aberration of a light beam passing an optical pickup.
Figure 2:
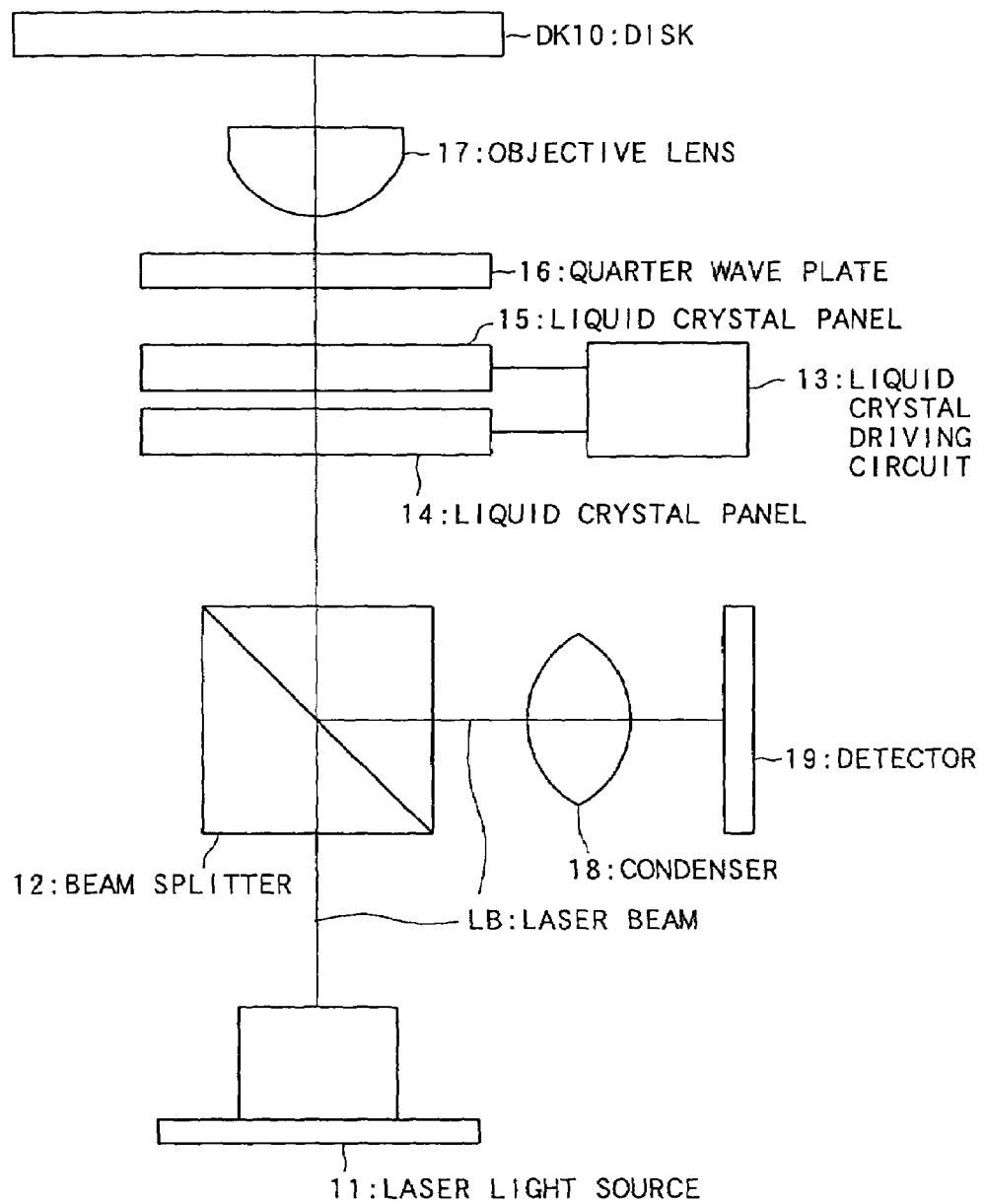
FIG. 2 shows the configuration of an optical pickup according to the present invention.

As shown by the configuration shown in FIG. 2, an optical pickup is provided with a laser light source 11, beam splitter 12, liquid crystal driving circuit 13 serving as the first and second drivers, liquid crystal panel 14 serving as a first corrector and a first liquid crystal device, liquid crystal panel 15 serving as a second corrector and a second liquid crystal device, quarter waver plate 16, objective lens 17, condenser 18, and detector 19. Of these constituents, the liquid crystal driving circuit 13 and the liquid crystal panels 14 and 15 compose an aberration correcting unit according to the present invention.

A laser beam LB radiated from the laser light source 11 enters, via the beam splitter 12, the liquid crystal panels 14 and 15 in sequence. This incidence light is made up of linearly polarized light of which polarized state is called s-polarized light, though a linearly polarized light perpendicular to the s-polarized light is called p-polarized light. The liquid crystal panel 14 acts on the s-polarized light, while the remaining liquid crystal panel 15 having liquid crystal of which orientation direction is rotated by 90 degrees acts on the p-polarized light. The light beam is subjected to an action based on a desired phase distribution at the liquid crystal panel 14, and converted into a circularly polarized light by the quarter wave plate 16. The thus-converted light passes the objective lens 17, and then focuses onto a spot on an information-recording surface of an optical disk DK10 to be detected. When parallel light beams are radiated in the normal manner, there occur some cases where it is difficult to obtain a preferable spot. In contrast, in this embodiment, the liquid crystal panel 14 has a wave front for correcting the aberration, so that a preferable spot can be formed on the optical disk DK10.

The laser beam that has been reflected from the information-recording surface of the disk DK10 passes the objective lens 17, and then passes the quarter wave panel 16, thus being converted to the p-polarized light. This p-polarized light is then subjected to the action of the liquid crystal panel 15. Specifically, the liquid crystal panel 15 operates to correct an aberration of the reflected laser beam LB, and divide the laser beam LB into plural parallel light fluxes. After this, the divided light fluxes fall onto the detector 19 to form an image thereon, after passing the beam splitter 12 and the condenser 18.

In general, an aberration caused during a travel of the radiated laser beam from the laser light source 11 to the quarter wave plate 16 (i.e., the outward optical path) and an aberration caused during a travel of the returning laser beam from the disk DK10 to the detector 19 (i.e., the homeward optical path) are made to be equal to each other. Hence, an amount of correction to be given to the liquid crystal panel 14 responsible for correcting the aberration in the outward optical path may be equal to an amount of correction to be given to the liquid crystal panel 15 responsible for correcting the aberration in the homeward optical path. In other words, the liquid crystal panel 14 differs from the liquid crystal panel 15 only in that the orientations of both the panels 14 and 15 are perpendicular to each other, so that control amounts to be given to both the panels 14 and 15 are the same.

The liquid crystal panel 14 is provided with a plate-like clear electrode divided into plural areas, such as grids. The voltage applied to each divided area is controlled variably by the liquid crystal driving circuit 13, thus a refraction index at each divided area being changed to give a phase difference to light passing thereat. This control for the phase difference will enable aberrations, such as coma aberration and spherical aberration, to be corrected.

Figure 3:
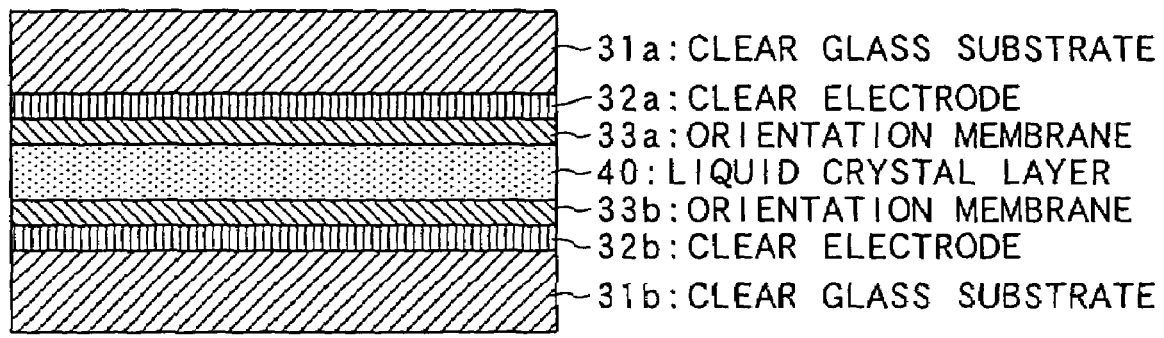
FIG. 3 outlines a section of a liquid crystal panel used by the pickup.

Referring to FIG. 3, the structure of a liquid crystal panel will now be exemplified, such structure being used by the liquid crystal panels 14 and 15. Though FIG. 3 outlines a section of a liquid crystal panel portion used by the liquid crystal panel 14, the remaining liquid crystal panel 15 has the similar structure to that shown in FIG. 3.

In FIG. 3, the structure is equipped with clear glass substrate 31a and 31b. On one side of each of the substrates 31a and 31b, there is formed a clear electrode 32a (32b) by a deposition technique. Further, on each of the clear electrodes 32a and 32b, an orientation membrane 33a (33b) is formed to give liquid crystal molecules a designated molecular orientation. An air-tight space formed between the orientation membranes 33a and 33b is charged with liquid crystal molecules with a double reflex characteristic, such as nematic liquid crystal, thus the charged liquid crystal molecules forming a liquid crystal layer 40 that serves as a refraction-index changing element.

In this layer configuration, at least either the clear electrodes 32a and 32b is divided into a plurality of areas, such as grids. This divided-area configuration is made such that voltage applied to each of the divided areas of the electrode can be controlled by the liquid crystal driving circuit 13.

The liquid crystal layer 40 air-tightly charged between the clear glass substrates 31a and 31b has a refraction index in an optical axis direction of the liquid crystal molecules, which is different from that in the perpendicular direction to the optical axis direction. This is referred to as a double reflex effect.

Changing a voltage applied to the clear electrodes 32a and 32b allows the liquid crystal layer 40 to freely change the direction of its liquid crystal molecules from a horizontal orientation to a vertical orientation. As a result, variably controlling the voltage to be applied to the clear electrodes 32a and 32b every divided area makes it possible that the refraction index of the liquid crystal varies freely on a divided-area basis.

Because the refraction index (=n) is changeable on the divided-area basis, a light beam that passes each divided area is given an optical path difference of "$\Delta n \cdot d$" ($\Delta n$ denotes a change in the refraction index and d denotes a thickness of the cell of the liquid crystal layer 40), that is, a phase difference of "$\Delta n \cdot d (2\Pi/\lambda)$" ($\lambda$ denotes the wavelength of the light). Accordingly, in the present embodiment, the voltage to be applied to each divided area by the liquid crystal driving circuit 13 can be controlled depending on an aberration that has been caused, thus a refraction index being adjusted every divided area, thus the aberration being corrected.

In the present embodiment, the aberration to be corrected by the liquid crystal layer includes any of a wave front aberration due to an error in the disk thickness, a coma aberration of the objective lens, and a spherical aberration thereof.

Figure 4:
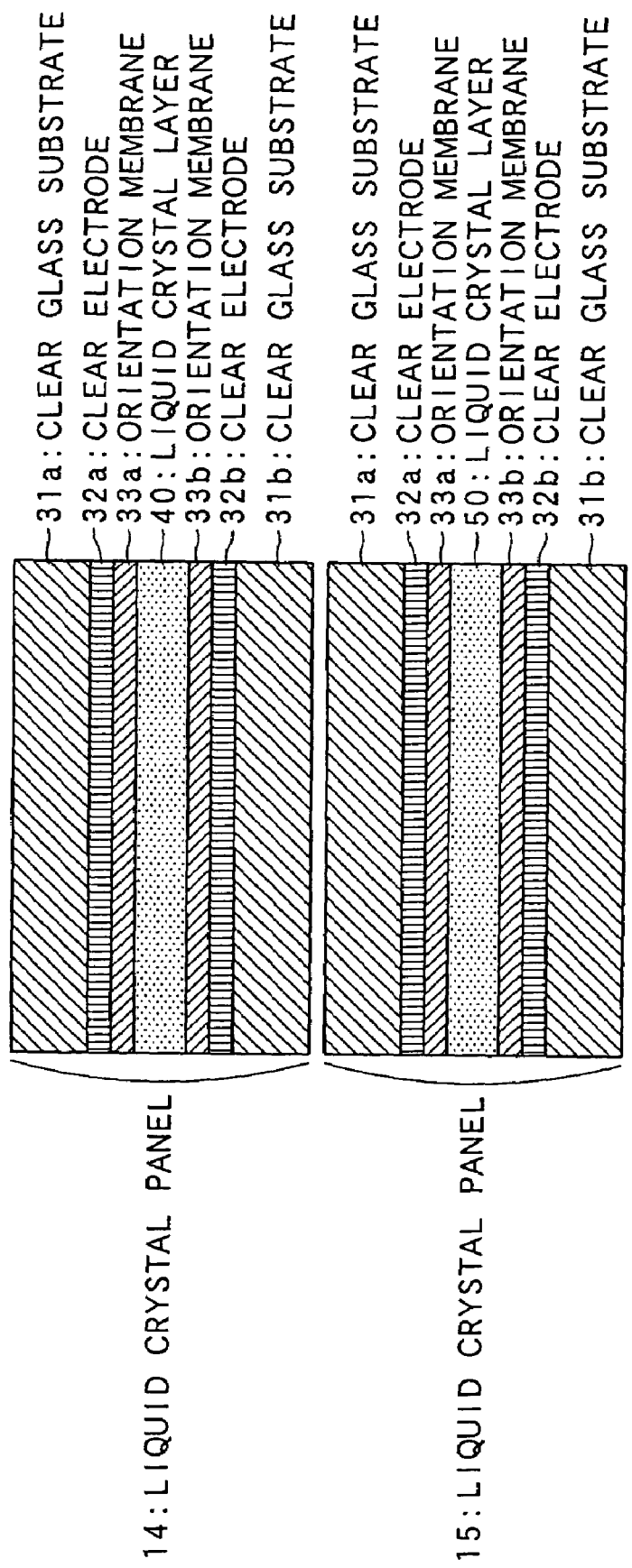
FIG. 4 shows an example of arrangement of two liquid crystal layers according to a first embodiment of the present invention.
Figure 5:
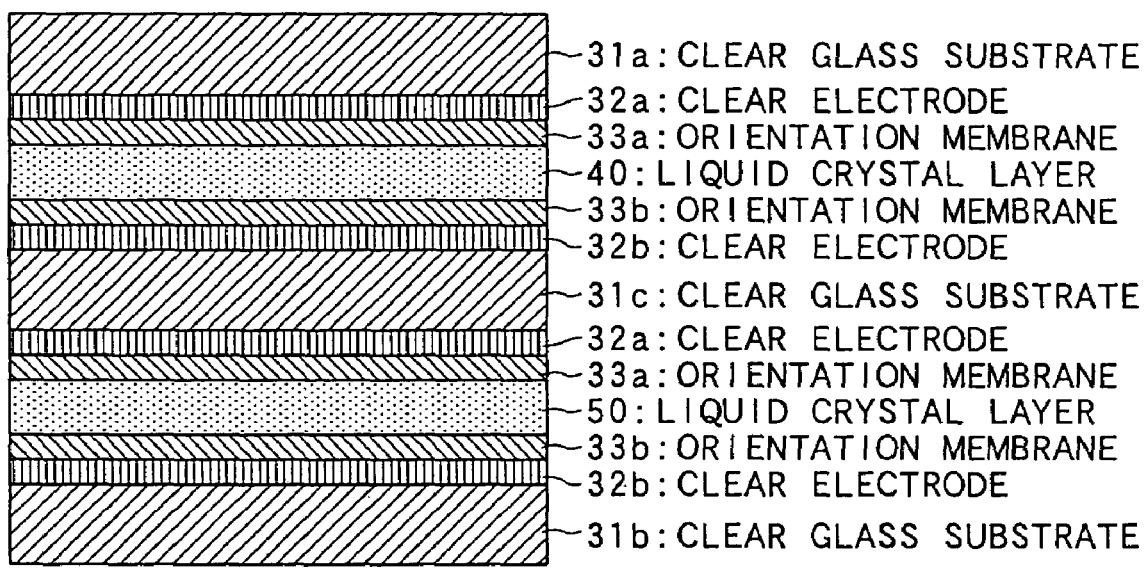
FIG. 5 shows another example of arrangement of two liquid crystal layers according to the first embodiment.

Referring to FIGS. 4 and 5, how to arrange the two liquid crystal panels 14 and 15 will now be described. FIGS. 4 and 5 exemplify arrangements of such two liquid crystal panels, respectively.

FIG. 4 shows one arrangement example, in which the two liquid crystal panels 14 and 15 are superposed one on the other such that the liquid crystal panel 40 of the panel 14 has an orientation direction of liquid crystal molecules perpendicular to that of the liquid crystal layer 50 of the panel 15.

Moreover, FIG. 5 shows the other arrangement example, in which two liquid crystal layers consisting of a liquid crystal layer 40 for an outward optical path and a liquid crystal layer 50 for a homeward optical path are formed as a single liquid crystal panel. These two layers are configured to share a single clear glass substrate 31c. In the arrangement shown in FIG. 5, the liquid crystal panel 40 for the outward optical path has also an orientation direction of liquid crystal molecules perpendicular to that of the liquid crystal layer 50 for the homeward optical path.

In addition, the positional relationships between the liquid crystal layers 40 and 50 are not limited to those shown in FIGS. 4 and 5, but can be reversed. Of course the same operations and advantages can be provided, as long as the orientation directions are orthogonal to each other.

Figure 6:
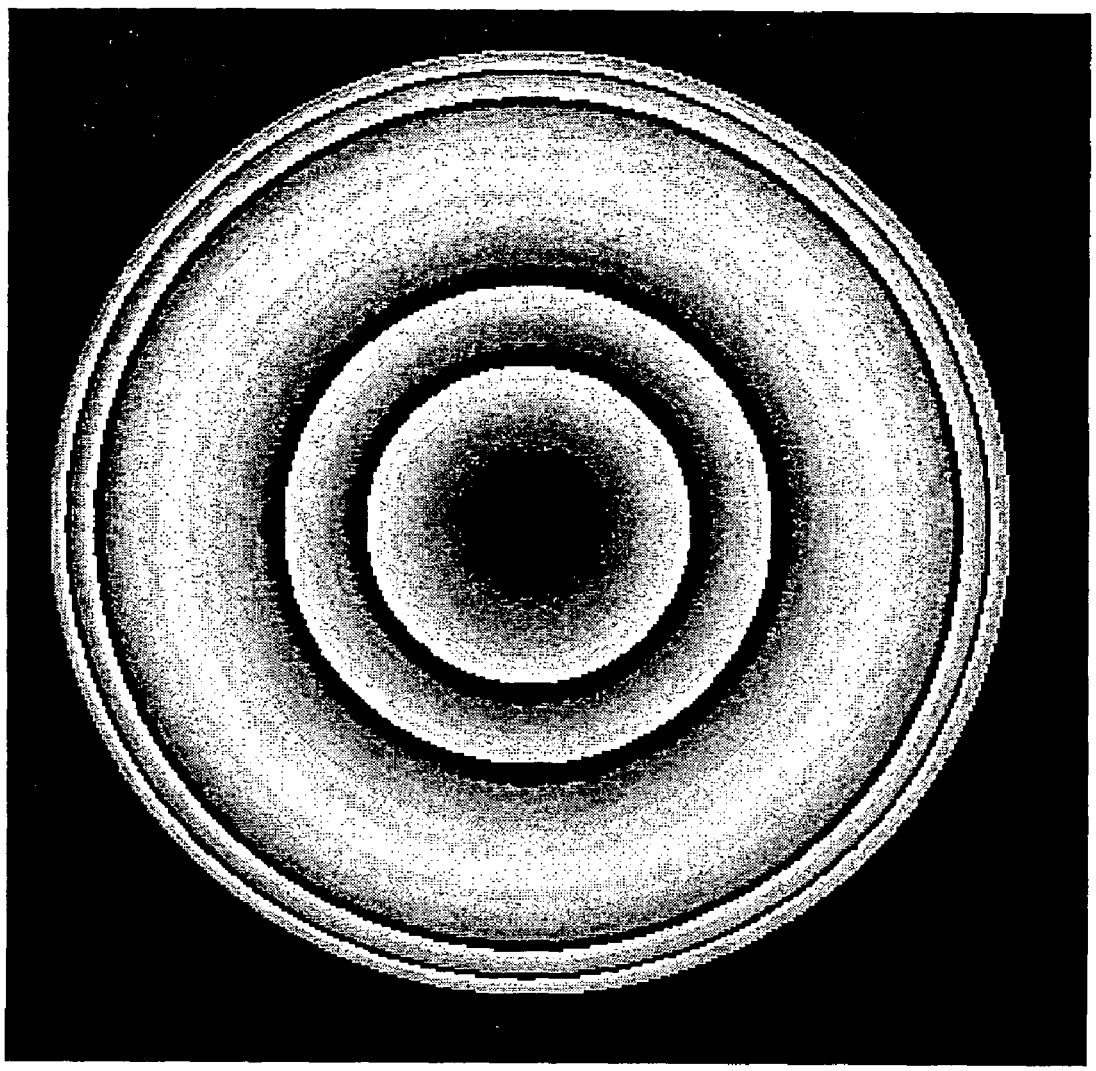
FIG. 6 exemplifies a phase distribution caused at one of two liquid crystal layers according to the first embodiment.
Figure 7:
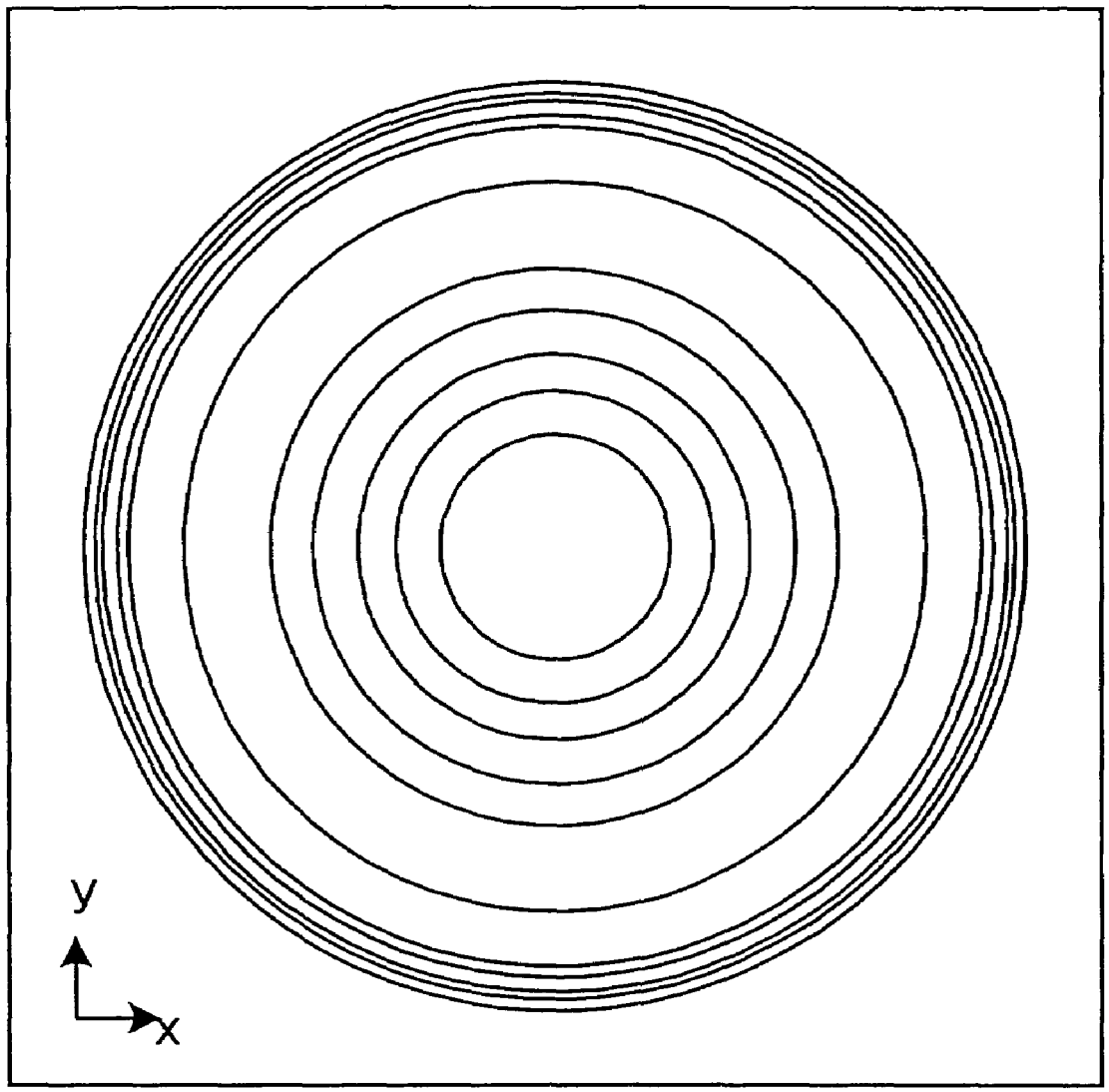
FIG. 7 exemplifies a segment division of an electrode at the one of the liquid crystal layers in the first embodiment.

Referring to FIGS. 6 and 7, a phase distribution created by the liquid crystal layer 40 for the outward optical path will now be explained. FIG. 6 exemplifies a phase distribution created by the liquid crystal layer 40, while FIG. 7 exemplifies a segment division of the electrode in the liquid crystal layer 40.

FIG. 6 uses shading of hues to show a phase distribution in the liquid crystal layer 40. The phase distribution is illustrated by values from 0 to 1 wavelength, except for integral-multiple wavelengths. In FIG. 6, the while denotes 1 wavelength, the black denotes a wavelength of zero, and gradations between the white and black denotes phases between 0 and 1 wavelength. As shown in FIG. 6, the liquid crystal panel 14 provides a phase distribution for correcting a spherical aberration. To provide such a phase distribution, by way of example, the liquid crystal panel 14 is divided into concentric segments, as shown in FIG. 7, and a voltage is applied segment by segment to allow the liquid crystal at each segment to have a desired refraction index.

Figure 8:
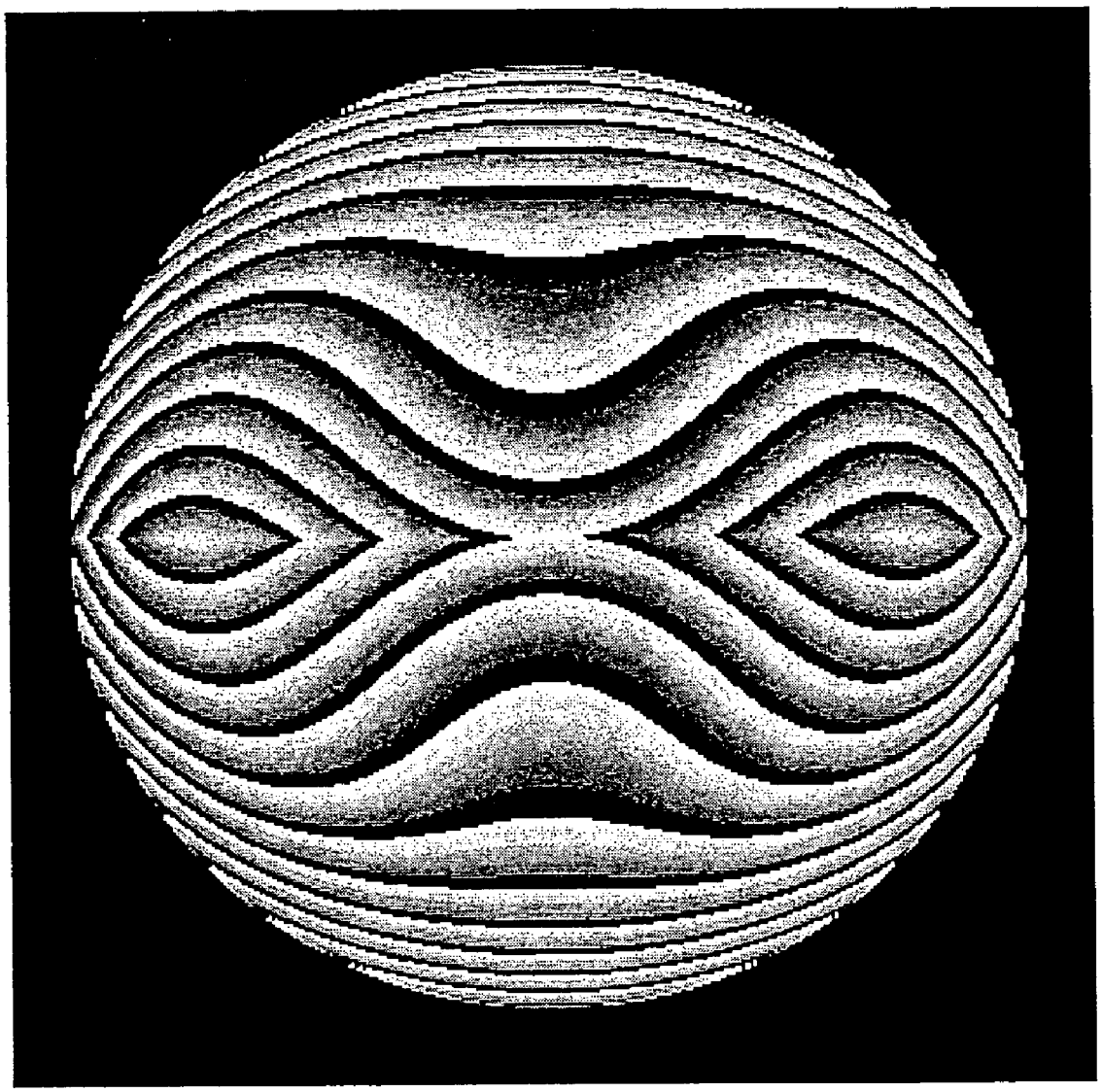
FIG. 8 exemplifies a phase distribution caused at the other of the two liquid crystal layers according to the first embodiment.
Figure 9:
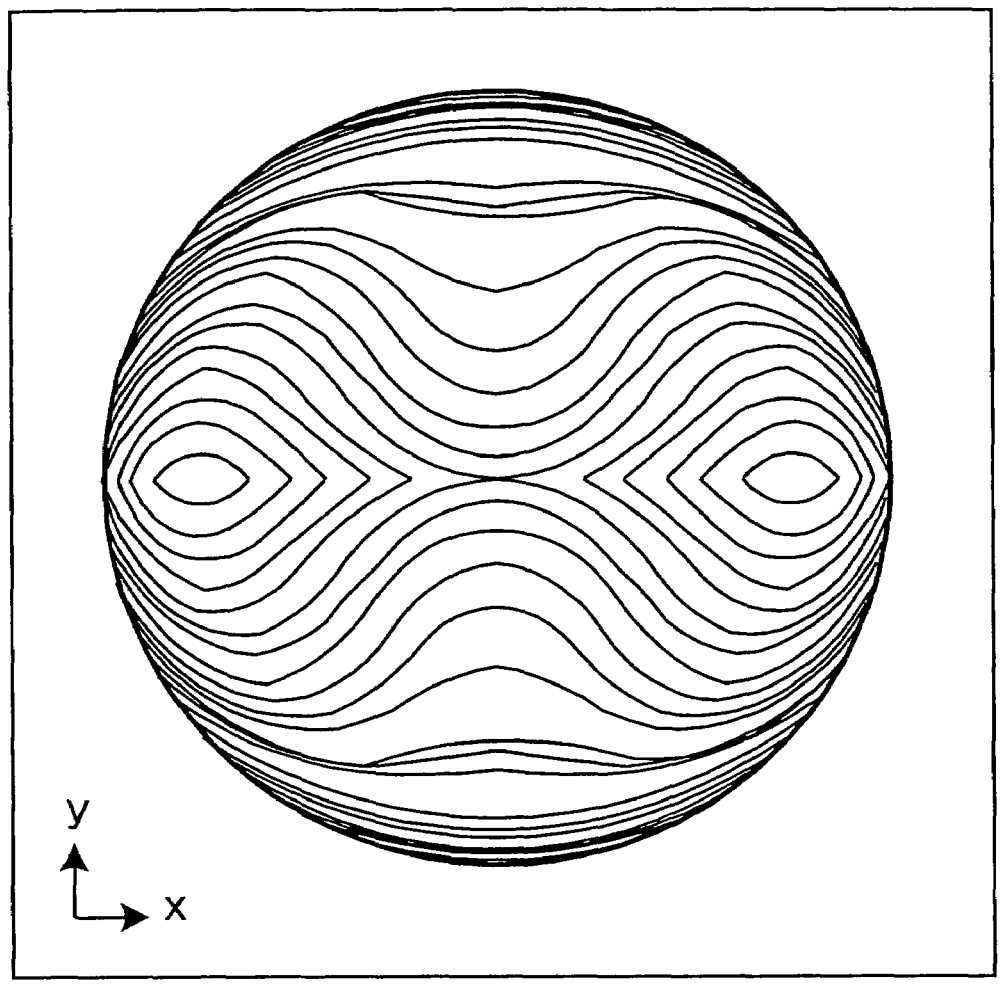
FIG. 9 exemplifies a segment division of an electrode at the other crystal layer in the first embodiment.

Referring to FIGS. 8 and 9, a phase distribution generated by the liquid crystal layer 50 for the homeward optical path will now be described. FIG. 8 exemplifies a phase distribution created by the liquid crystal layer 50, while FIG. 9 exemplifies a segment division of the electrode in the liquid crystal layer 50.

Like the illustration in FIG. 6, FIG. 8 depicts the phase distribution in the panel by shading of hues. A pattern shown in FIG. 8 is used to correct an aberration of the laser beam LB and to give a phase distribution to be divided into two spots in the y-direction. Namely, the phase distribution shown in FIG. 8 is formed by mutually superposing a first electrode pattern and a second electrode pattern. The first electrode pattern is for correcting the aberration of the laser beam LB in the homeward optical path, whilst the second electrode pattern is for a phase distribution for dividing the laser beam LB into two beams in the y-direction.

When the phase distribution created by the liquid crystal layer 50 is $\Phi r(x, y)$ and the phase distribution created by the liquid crystal layer 40 is $\Phi i(x, y)$, the phase distribution $\Phi r(x, y)$ is given by the following equation (1).

$$\Phi r(x, y) = \Phi i(x, y) + 0.005y \quad (y \geq 0)$$
$$\Phi r(x, y) = \Phi i(x, y) - 0.005y \quad (y < 0) \quad (1)$$

FIG. 9 exemplifies the segment division of the electrode, which is created for such a phase distribution. As shown in FIG. 9, the liquid crystal layer 50 is divided into segments, and the refraction index at each segment is controlled to obtain the phase distribution shown in FIG. 8.

Figure 10:
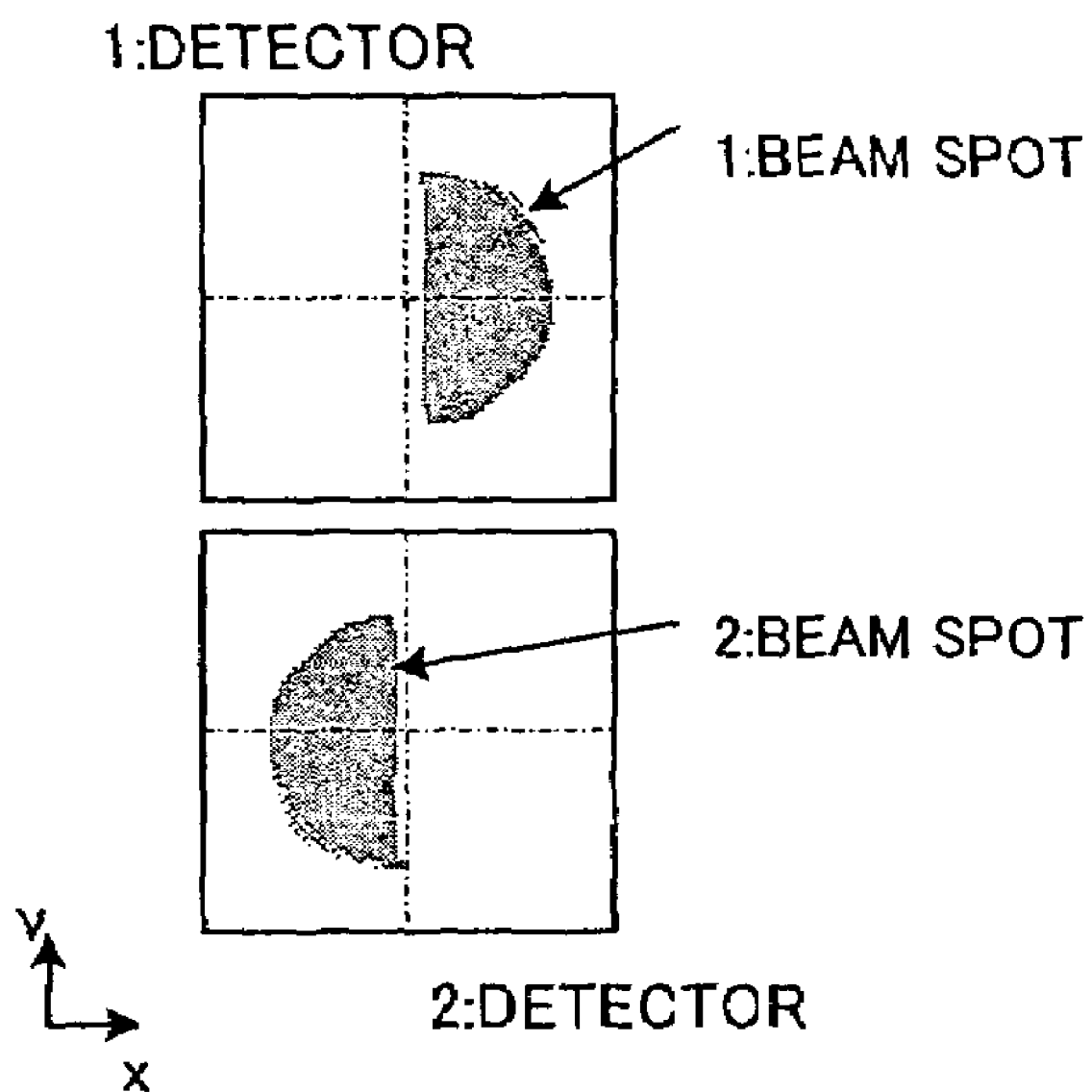
FIG. 10 illustrates beam spots on detectors when a two-divisional manner is adopted.

With reference to FIG. 10, beam spots focused onto the detector 19 will now be described. FIG. 10 explains the beam spots on the detector 19, which are realized when a two-division technique is adopted. The detector 19 consists of two detectors 191 and 192 arranged in line in the y-axis (longitudinal axis) direction, as shown in FIG. 10. On the two detectors 191 and 192, there are formed, respectively, two beam spots BS1 and BS2 divided by the liquid crystal layer 50.

One beam spot BS1 is a spot formed by the laser beam LB that has passed a partial region, which is defined by y>0, of the liquid crystal layer 50.

In contrast, the other beam spot BS2 is a spot formed by the laser beam LB that has passed the remaining partial region, which is defined by y<0, of the liquid crystal layer 50. In this way, the laser beam LB is divided and focused onto the different detectors.

As described above, the aberration correcting unit is provided with the first corrector to correct the aberration of an outward light beam and the liquid crystal panel 14 serving as the first aberration correcting device, and the second corrector to correct the aberration of a homeward light beam and divide the homeward light beam into plural spots and the liquid crystal panel 15 serving as the second aberration correcting device. Thus, with no additional use of optical parts such as polarizing hologram, but with the aberration corrected like the conventional, the light returning from the optical disk DK10 to be detected can be divided into plural spots.

Each of the liquid crystal panels 14 and 15 is provided with a liquid crystal layer serving as a refraction-index changing element for changing a refraction index based on a voltage to be applied and electrodes used to apply the voltage to the liquid crystal layer so that the aberration is corrected. Variably controlling the application of the voltage on a divided-segment basis makes it possible to freely adjust a refraction index of the liquid crystal every divided section. Thus, the aberration can be corrected and the phase distribution based on the divided segments can be given well.

The liquid crystal panel 15 is structured such that the first and second electrode patterns are superposed one on the other, the first electrode pattern being directed to correction of the aberration of a light beam after reflected from the optical disk DK10 and the second electrode pattern being formed to divide the reflected light beam into plural light beams. Hence the single liquid crystal panel performs both the correction of the aberration and the division of the reflected light beam.

The liquid crystal panel 14 is placed so that its orientation is made in the polarizing direction of a light beam entering the optical disk DK10, while the liquid crystal panel 15 is placed in such a manner that its orientation is made in the polarizing direction of a light beam reflected from the optical disk DK10. Hence the aberration of the light beam caused in each of an outward optical path and a homeward optical path can be corrected.

In the case that the tracking control is performed based on the push-pull technique, a tracking offset will be caused on account of an eccentricity of the objective lens if a beam spot is divided into plural spots on the detector. However, such a drawback can therefore be overcome in the present embodiment. Since the reflected light beam is divided into two light beams so as to be detected by different detectors, so that there is no occurrence of the tracking offset.

(Second Embodiment)

A second embodiment of the present invention will now be described. For that the present embodiment and subsequent embodiments employ the optical configuration similar to that of the first embodiment, the explanation of the configuration will now be omitted.

In the second embodiment, the phase pattern, which is given by the liquid crystal layer 50 in the first embodiment, is modified into another one. That is, the laser beam LB is divided into four beams, while still correcting the aberration.

Figure 11:
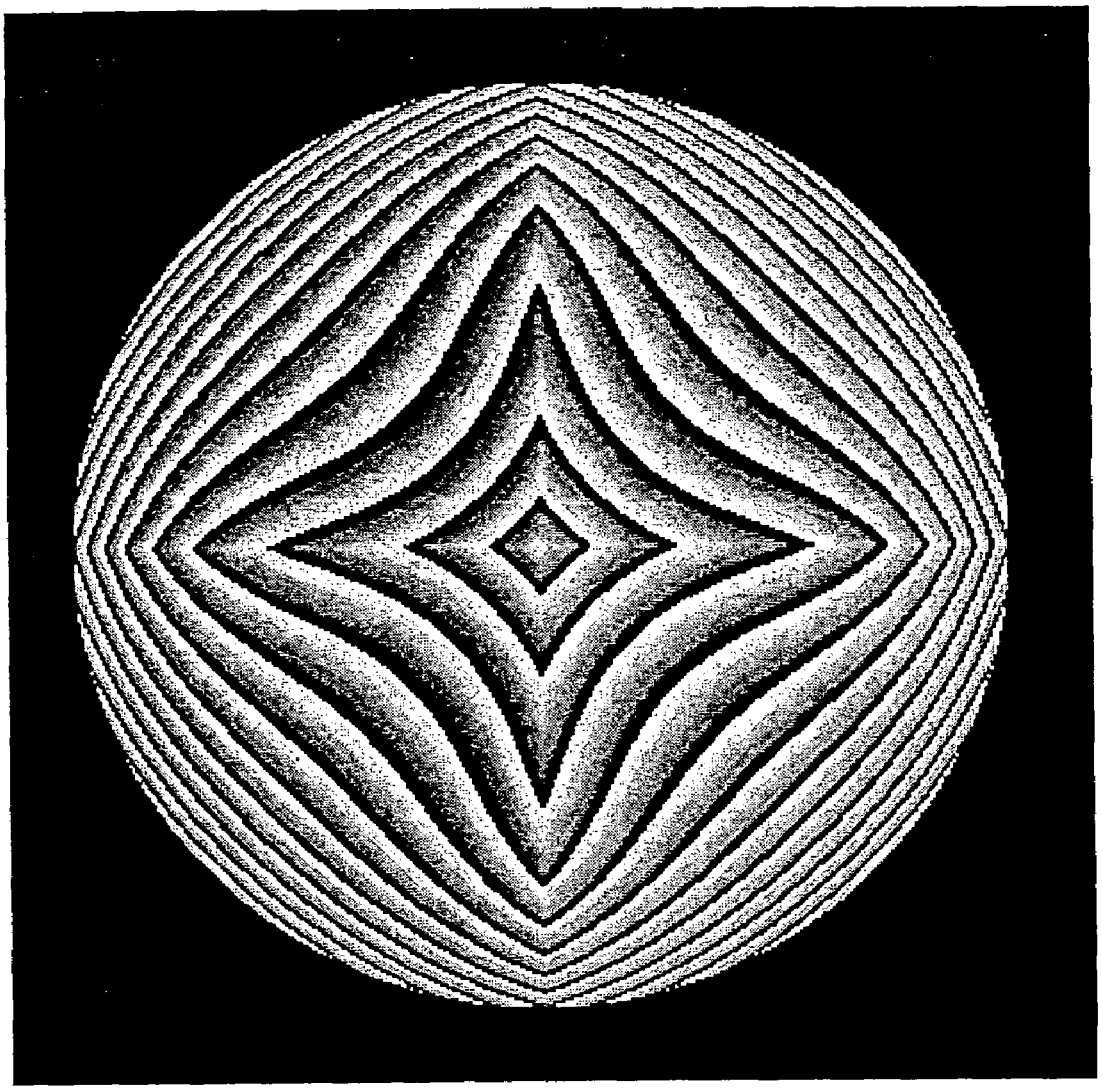
FIG. 11 exemplifies a phase distribution caused at one of two liquid crystal layers according to a second embodiment of the present invention.
Figure 12:
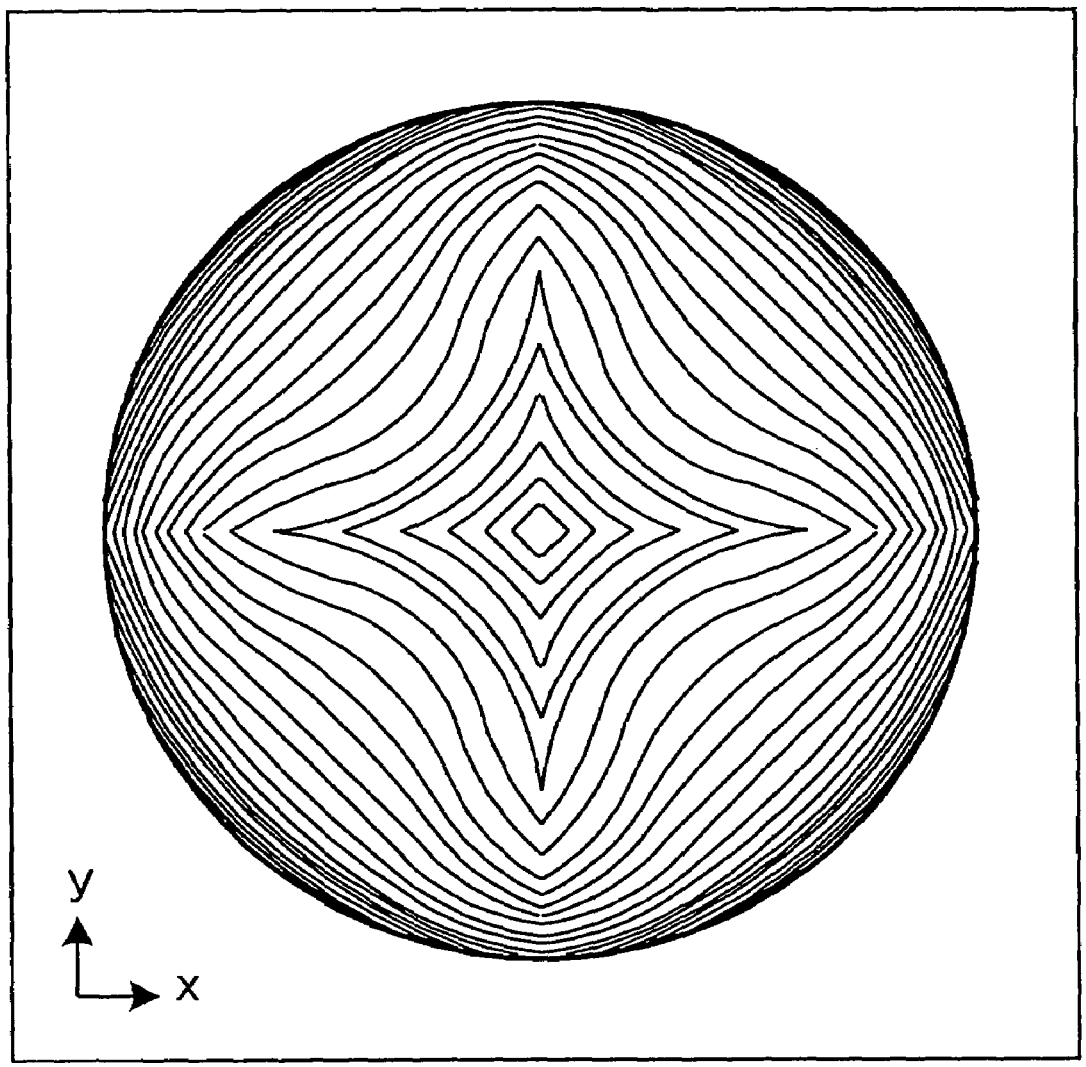
FIG. 12 exemplifies a segment division of an electrode at the one of the two liquid crystal layers in the second embodiment.

Referring to FIGS. 11 and 12, a phase distribution created by the liquid crystal layer 50 will now be explained. FIG. 11 exemplifies a phase distribution created by the liquid crystal layer 50, while FIG. 12 exemplifies a segment division of the electrode in the liquid crystal layer 50.

Like the illustrations in FIGS. 6 and 8, FIG. 11 uses shading of hues to show a phase distribution in the liquid crystal layer 50. The pattern shown in FIG. 11 is a phase distribution to divide the laser beam LB into four beams.

The phase distribution Φr(x, y) is given by the following equation of:

$$\Phi r(x, y) = \Phi i(x, y) + 0.005x + 0.005y (x \geq 0, y \geq 0)$$

$$\Phi r(x, y) = \Phi i(x, y) - 0.005x + 0.005y (x < 0, y > 0)$$

$$\Phi r(x, y) = \Phi i(x, y) - 0.005x - 0.005y (x < 0, y < 0)$$

$$\Phi r(x, y) = \Phi i(x, y) + 0.005x - 0.005y (x > 0, y < 0) \quad (2).$$

FIG. 12 exemplifies the segment division of the electrode created for such a phase distribution. As shown in FIG. 12, the liquid crystal layer 50 is divided into segments, and the refraction index at each segment is controlled to obtain the phase distribution shown in FIG. 11.

Figure 13:
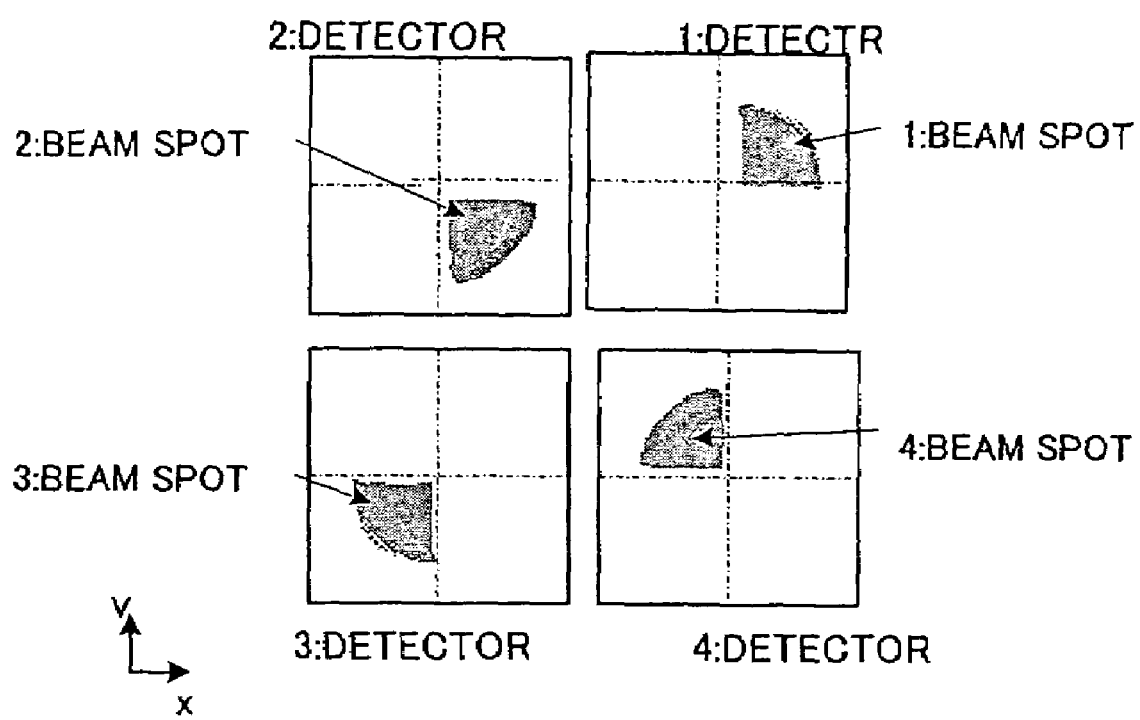
FIG. 13 is an illustration for a third embodiment of the present invention, which illustrates beam spots on detectors when a four-divisional manner is adopted.

With reference to FIG. 13, beam spots focused onto the disk 19 will now be described. FIG. 13 explains the beam spots on the detector 19, which are realized when a four-division technique is adopted. The detector 19 consists of four detectors 193 and 196 arranged in line, two by two, both in the y-axis (longitudinal axis) direction and in the x-axis (lateral axis) direction, as shown in FIG. 13. On the four detectors 193 to 196, there are formed, respectively, four beam spots BS3 to BS6 divided by the liquid crystal layer 50.

Of these beam spots BS3 to BS6, one beam spot BS3 is a spot formed by the laser beam LB that has passed a partial region, which is defined by x>0 and y>0, of the liquid crystal layer 50. Another beam spot BS4 is a spot formed by the laser beam LB that has passed a partial region, which is defined by x<0 and y>0, of the liquid crystal layer 50; another beam spot BS5 is a spot formed by the laser beam LB that has passed a partial region, which is defined by x<0 and y<0, of the liquid crystal layer 50; and the remaining beam spot BS6 is a spot formed by the laser beam LB that has passed a partial region, which is defined by x>0 and y<0, of the liquid crystal layer 50.

In addition, in the present embodiment, the positional relationships between the liquid crystal layers 40 and 50 are not limited to those shown in FIGS. 4 and 5, but can be reversed. Of course the same operations and advantages can be provided, as long as the orientation directions are orthogonal to each other.

Accordingly, in addition to having the similar advantages to those obtained by the first embodiment, the present embodiment is able to remove a tracking offset caused due to a disk tilt in a tangential direction in DPD tracking, because the light beam is divided into four beams.

(Third Embodiment)

Figure 14:
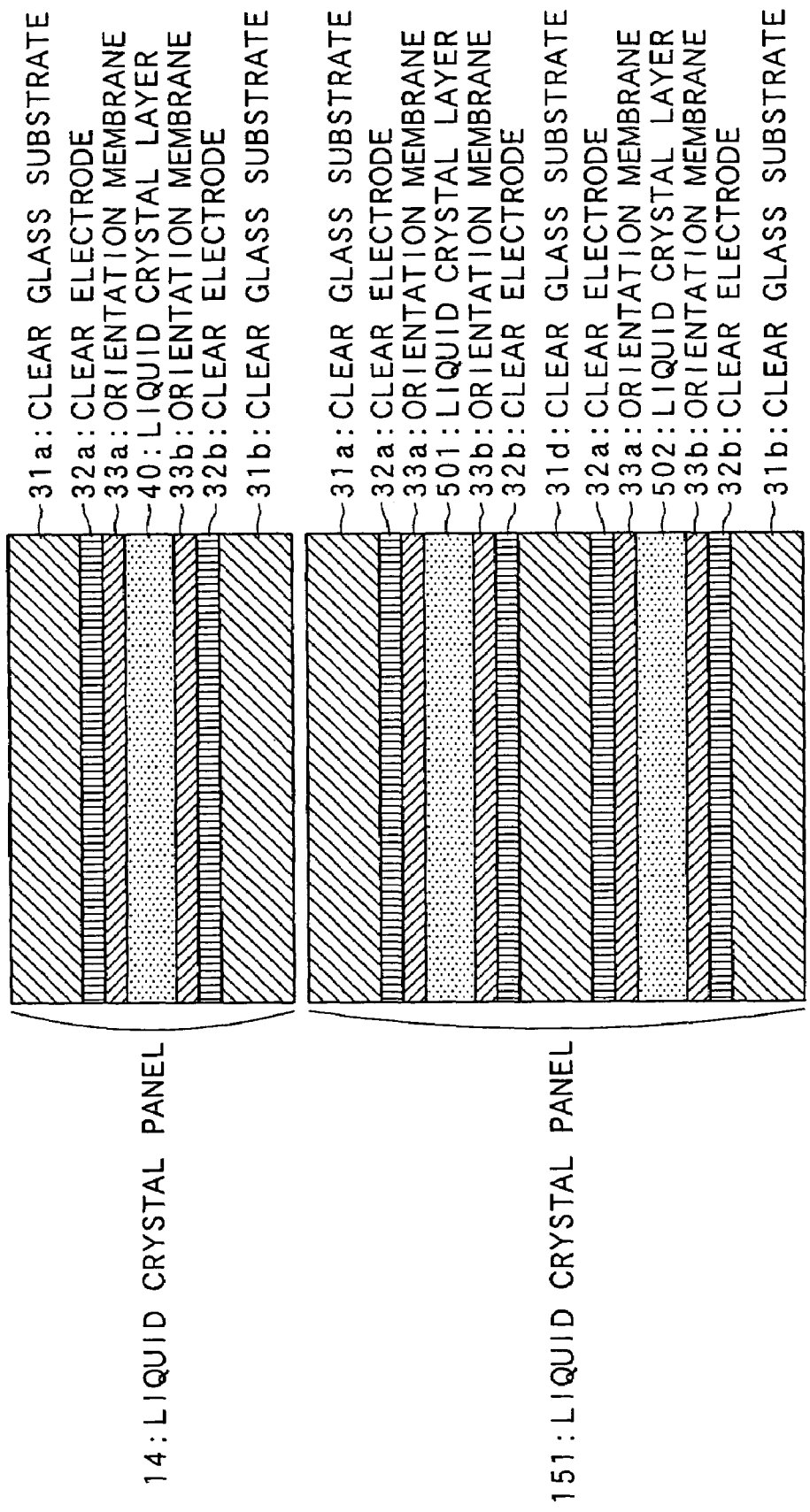
FIG. 14 illustrates an outlined section of a liquid crystal panel according to the third embodiment, in which two liquid crystal layers are used to correct an aberration of returning light along a homeward optical path and divide the light into several beams.
Figure 15:
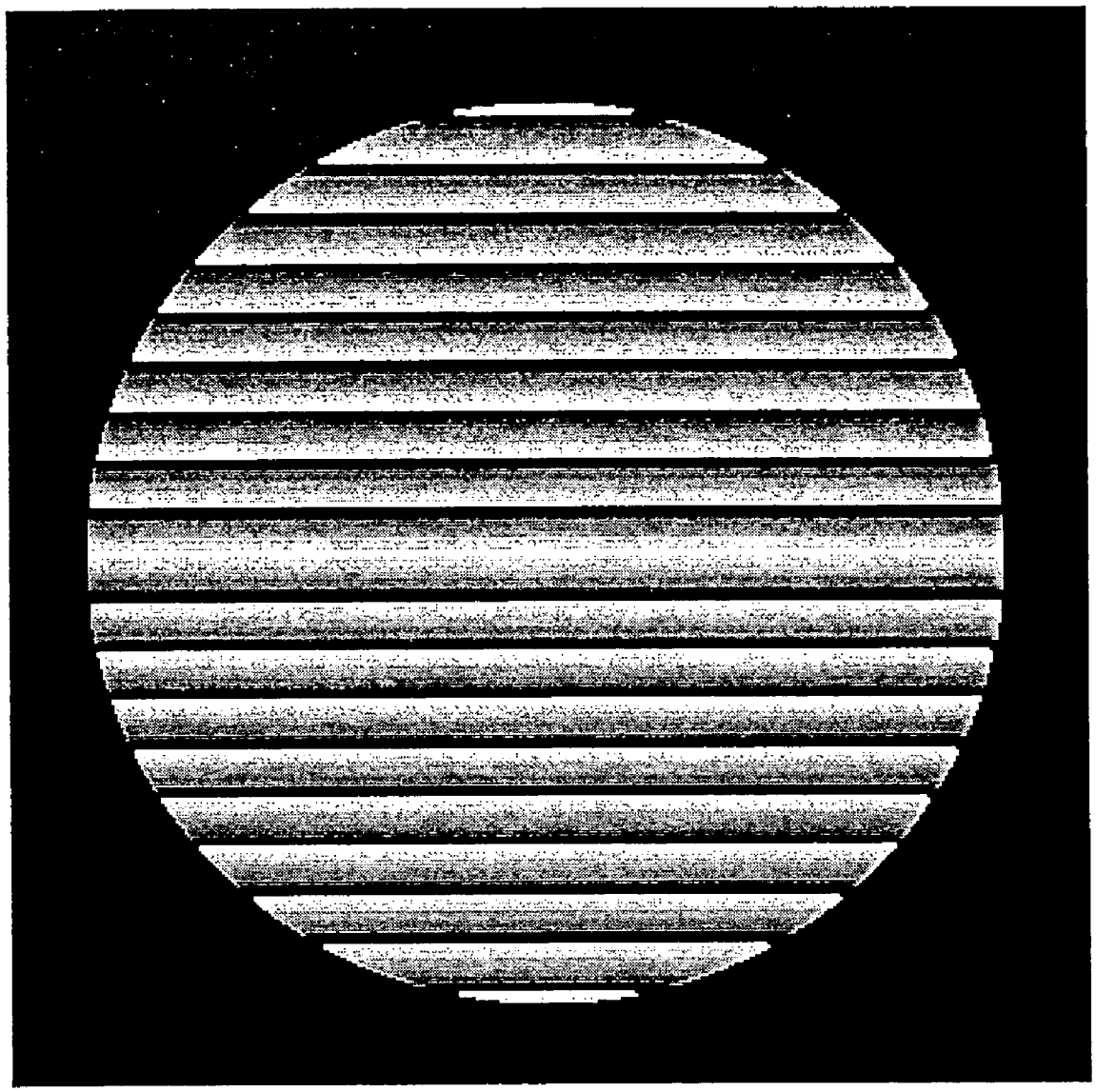
FIG. 15 exemplifies a phase distribution caused at one of liquid crystal layers according to the third embodiment.
Figure 16:
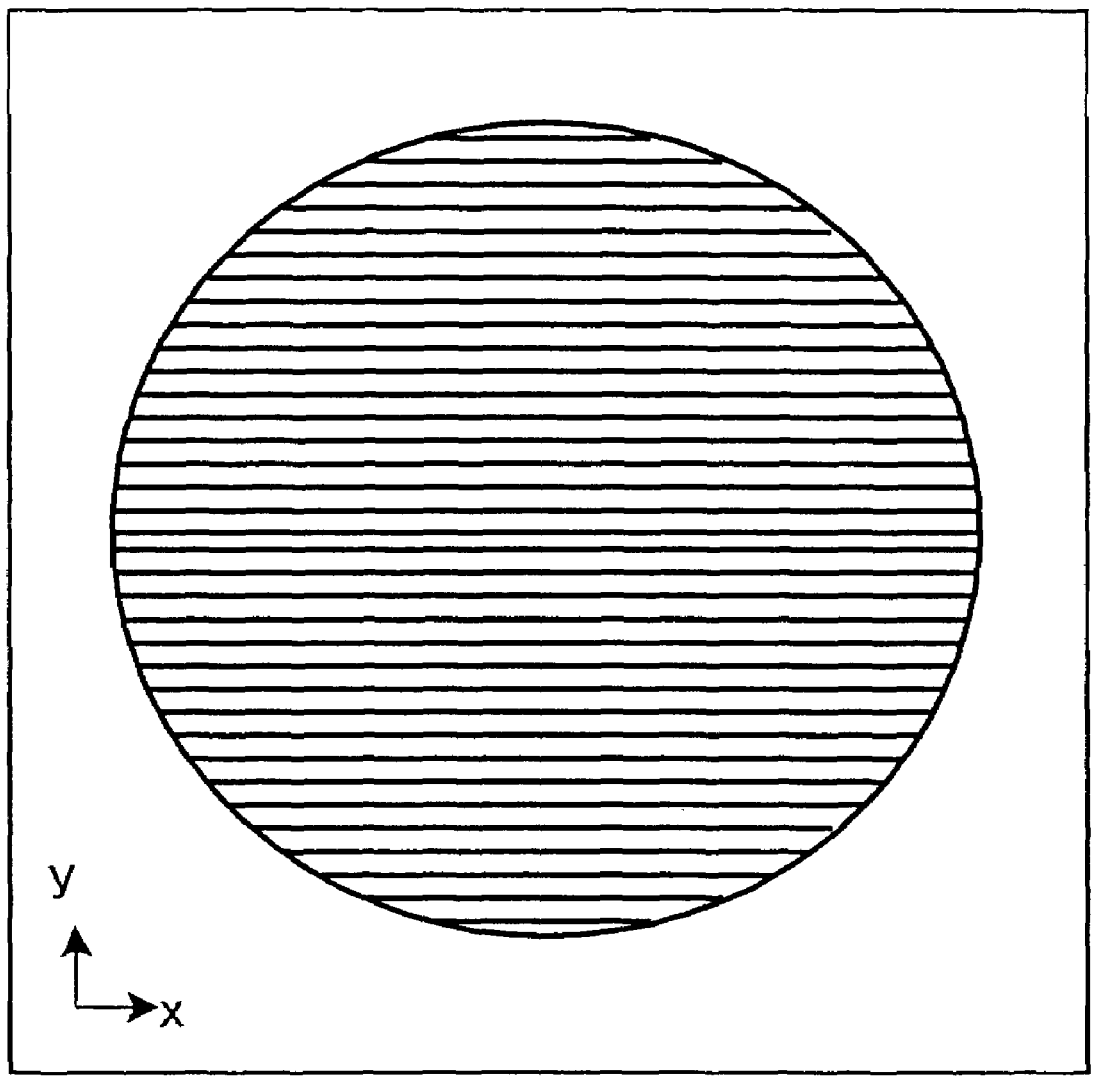
FIG. 16 exemplifies a segment division of an electrode at the one of the liquid crystal layers in the third embodiment.

Referring to FIGS. 14 to 16, a third embodiment of the present invention will now be described.

The present embodiment provides a further modification concerning the configuration of the liquid crystal layer. In the foregoing first and second embodiments, the single liquid crystal layer (i.e., the liquid crystal layer 50) has been solely responsible for correcting the aberration of the homeward laser beam LB and providing the phase distribution for the beam division. Instead of this, the third embodiment is directed to the creation of the same phase distribution by using a plurality of liquid crystal layers (i.e., liquid crystal panels).

In connection with FIG. 14, a liquid crystal panel according to the present embodiment will now be described. FIG. 14 exemplifies a liquid crystal panel in which two liquid-crystal layers are embedded to correct the aberration and the division of a homeward light beam.

In the foregoing first and second embodiments, the liquid crystal panel 15 having the single liquid crystal layer 50 has created the actions based on the phase distribution (refer to FIG. 4). In contrast, in this third embodiment, as shown in FIG. 14, such actions are created by a liquid crystal panel 151 in which two liquid crystal layers 501 and 502 are embedded. Incidentally, the panel structure shown in FIG. 14 includes the liquid crystal panel 14 for correcting the aberration of an outward laser beam LB, the panel 14 providing the identical configuration and operations to those described in the first and second embodiments.

As to the liquid crystal layer 501 embedded in the liquid crystal panel 151, a phase distribution provided by the liquid crystal layer 501, which corresponds to the foregoing equation (1) for the liquid crystal panel 15, is defined by the following equation (3).

$$\Phi r1(x, y) = \Phi i(x, y) \quad (3)$$

Furthermore, a phase distribution provided by the liquid crystal layer 502 is defined by the following equation (4).

$$\Phi r2(x, y) = 0.005y (y \geq 0)$$

$$\Phi r2(x, y) = -0.005y (y < 0) \quad (4)$$

The equations (3) and (4) give a total phase distribution provided by a combination of the liquid crystal layers 501 and 502, which is thus given by an equation of:

$$\Phi r(x, y) = \Phi r1(x, y) + \Phi r2(x, y) \quad (5),$$

which is completely identical to the equation (1) shown in the first embodiment.

The phase distribution given by the liquid crystal layer 501 is identical to that given by the liquid crystal panel 14 for the outward (incident) light beam. Thus, the liquid crystal layer 501 can use, as its electrode division pattern, the outward light-beam electrode pattern.

The phase distribution of the liquid crystal layer 502, which is given by the equation (4), can be illustrated as shown in FIG. 15. This phase distribution can be realized by dividing the electrode into plural segments on the basis of a relatively simple pattern.

In the panel configuration shown in FIG. 14, the outward light-beam liquid crystal panel 14 and the homeward light-beam liquid crystal panel 151 are separated from each other, thus being formed into an individual panel structure. However, other panel configurations are off course possible. For instance, both the panels 14 and 151 can be laminated to each other. Alternatively, placing three or more kinds of liquid crystal layers within a single panel is able to provide the similar functions to the above.

In the present embodiment, the positional relationship between the liquid crystal layers is not limited to that shown in FIG. 14, but can be reversed. Of course, the same operations and advantages can be provided, as long as the orientation directions in the aberration-correcting two liquid layers are orthogonal to each other.

As described above, in addition to the similar advantages to those obtained by the first embodiment, the present embodiment provides an additional advantage that each of the electrode patterns for the liquid crystal layers is relatively simpler, due to the fact that the number of liquid layers are raised.

(Fourth Embodiment)

Figure 17:
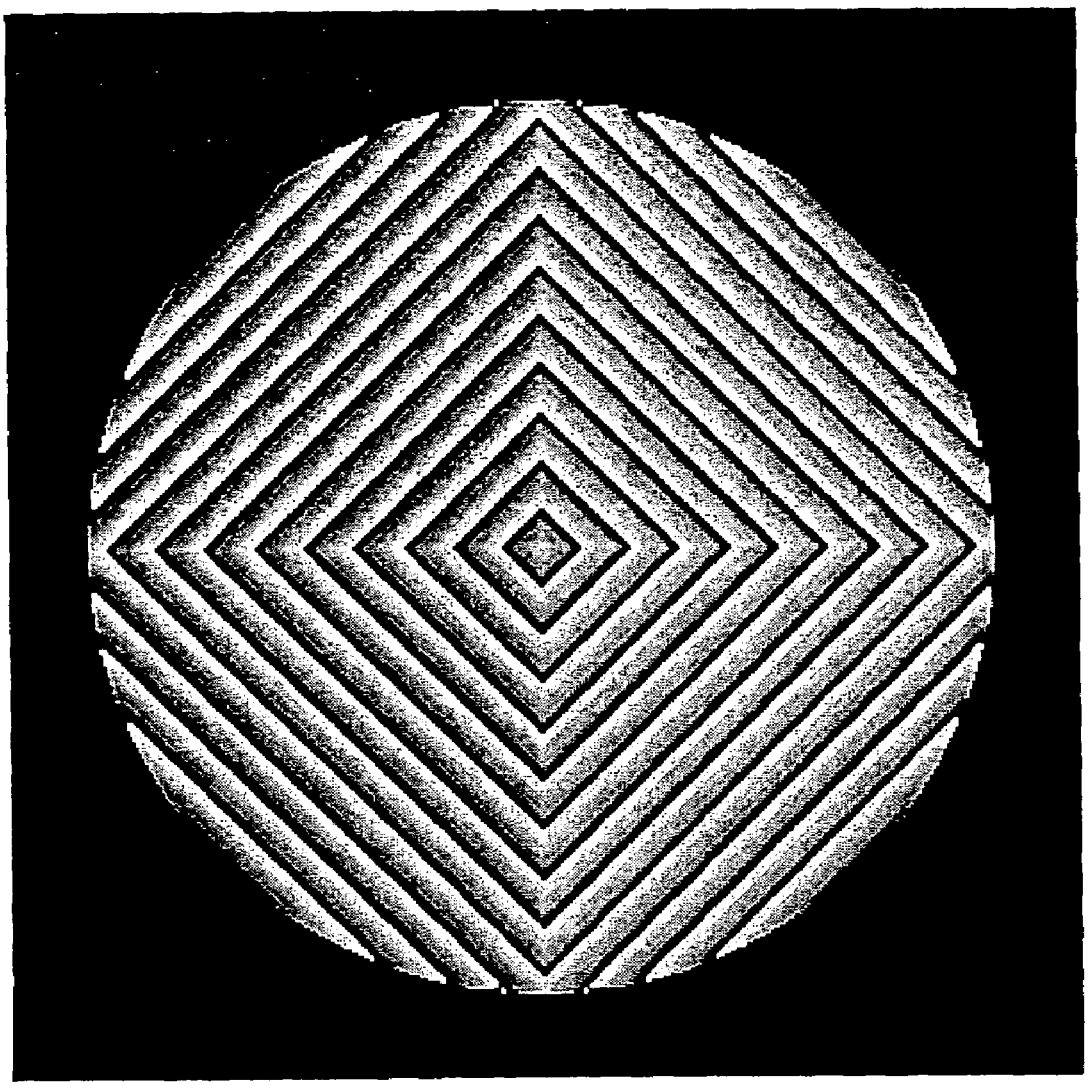
FIG. 17 exemplifies a phase distribution caused at one of liquid crystal layers according to a fourth embodiment of the present invention.
Figure 18:
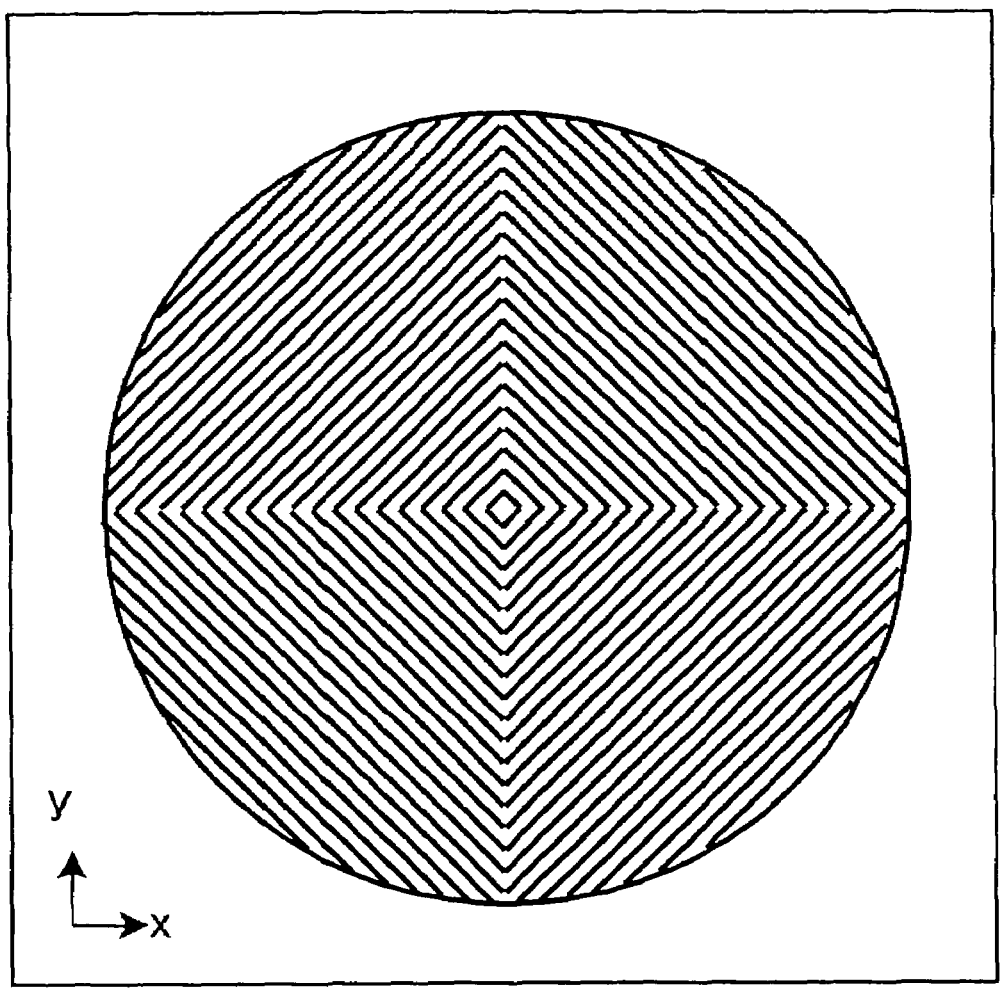
FIG. 18 exemplifies a segment division of an electrode at the one of the liquid crystal layers in the fourth embodiment.

Referring to FIGS. 14, 17 and 18, a fourth embodiment of the present invention will now be described.

The present embodiment relates to division of the homeward laser beam LB into four beams, with the aberration still corrected properly, by changing a phase pattern given to the liquid crystal panel 151 as shown in FIG. 14.

The optical system already been used by the foregoing embodiments is also applied to the present fourth embodiment, so its detailed explanation will be omitted.

Considering the phase distribution expressed by the foregoing equation (2) enabling the laser beam to be divided into four beams will lead to the following equation (6) and (7), which gives phase distributions to the liquid crystal layers 501 and 502.

That is, one liquid crystal layer 501 has a phase distribution defined by the following equation of:

$$\Phi r1(x, y) = \Phi i(x, y) \quad (6).$$

The other liquid crystal layer 502 has a phase distribution defined by the following equation of:

$$\Phi r2(x, y) = 0.005x + 0.005y (x \geq 0, y \geq 0)$$

$$\Phi r2(x, y) = -0.005x + 0.005y (x < 0, y > 0)$$

$$\Phi r2(x, y) = -0.005x - 0.005y (x < 0, y < 0)$$

$$\Phi r2(x, y) = 0.005x - 0.005y (x > 0, y < 0) \quad (7).$$

FIG. 17 exemplifies a phase distribution given to the laser beam by the liquid crystal layer 502, while FIG. 18 exemplifies divided segments of the electrode of the liquid crystal layer 502. As can be understood from FIGS. 17 and 18, compared to those of the liquid crystal layer 50 in the second embodiment, the electrode pattern can be more simplified.

In this panel configuration, the outward laser-beam liquid crystal panel 14 and the homeward laser-beam liquid crystal panel 151 can be laminated to each other to form a mono structure. Alternatively, placing three or more kinds of liquid crystal layers within a single panel is able to provide the similar functions to the above.

In the present embodiment, the positional relationship between the liquid crystal layers is not limited to that shown in FIG. 14, but can be reversed. Of course, the same operations and advantages can be provided, as long as the orientation directions in the aberration-correcting two liquid layers are orthogonal to each other.

In addition to the similar advantages to those obtained by the first embodiment, the present embodiment provides an additional advantage that each of the electrode patterns for the liquid crystal layers is relatively simpler, due to that fact that the number of liquid layers are raised.

By the way, the aberration-correcting unit with the liquid crystal, which is entitled to correct the aberration and divide the light beam, is not confined to those configurations described in the first and second embodiments. Such aberration-correcting unit can be applied to any kind of optical apparatus, provided that the apparatus is configured to detect a light beam reflected from an object to be detected.

For the sake of completeness, it should be mentioned that the embodiment explained so far is not a definitive list of possible embodiments of the present invention. The expert will appreciate that it is possible to combine the various construction details or to supplement or modify them by measures known from the prior art without departing from the basic inventive principle.

The entire disclosure of Japanese Patent Application No. 2002-304713 filed on Oct. 18, 2002 including the specification, claims, drawings and summary is incorporated herein by reference in its entirety.

What is claimed is:

1. An aberration correcting device used by an aberration correcting unit for correcting an aberration of a light beam radiated onto an object to be detected and then reflected from the object, the aberration correcting device comprising:
    a first corrector configured to correct the aberration of the light beam radiated onto the object; and
    a second corrector configured to correct the aberration of the light beam reflected from the object and to divide the reflected light beam into a plurality of light beams.

2. The aberration correcting device according to claim 1, wherein each of the first and second correctors comprises
    a refraction index changing element configured to change a refraction index in response to a voltage to be applied thereto; and
    an electrode configured to apply the voltage to the refraction index changing element to correct the aberration.

3. The aberration correcting device according to claim 2, wherein the electrode of each of the first and second correctors is divided into at least two electrode segments to form an electrode pattern so that the electrode pattern gives the light beam a phase distribution,
    wherein the phase distribution given by the electrode pattern of the second corrector is formed by superposing, one on the other, a first phase distribution to correct the aberration of the light beam reflected from the object and a second phase distribution to divide the reflected light beam into the plurality of light beams.

4. The aberration correcting device according to claim 3, wherein the first and second correctors are composed of first and second liquid crystal elements, respectively.

5. The aberration correcting device according to claim 4, wherein both of the first and second liquid crystal elements are formed into one element with an intermediate substrate used in common.

6. The aberration correcting device according to claim 4, wherein the second liquid crystal element is composed of a first liquid crystal panel of which electrode pattern gives the first phase distribution and a second liquid crystal panel of which electrode pattern gives the second phase distribution.

7. The aberration correcting device according to claim 4, wherein the first liquid crystal element is arranged to orient liquid crystal molecules in accordance with a polarized direction of the light beam radiated onto the object and
    the second liquid crystal element is arranged to orient liquid crystal molecules in accordance with a polarized direction of the light beam reflected from the object.

8. The aberration correcting device according to claim 7, wherein both of the first and second liquid crystal elements are formed into one element with an intermediate substrate used in common.

9. The aberration correcting device according to claim 7, wherein the second liquid crystal element is composed of a first liquid crystal panel of which electrode pattern gives the first phase distribution and a second liquid crystal panel of which electrode pattern gives the second phase distribution.

10. An aberration correcting unit for correcting an aberration of a light beam radiated onto an object to be detected and then reflected from the object, the aberration correcting unit comprising:
    an aberration correcting device comprising a first corrector configured to correct the aberration of the light beam radiated onto the object; and a second corrector configured to correct the aberration of the light beam reflected from the object and to divide the reflected light beam into a plurality of light beams;

a first driver configured to drive the first corrector; and a second driver configured to drive the second corrector.

11. The aberration correcting unit according to claim 10, wherein the object is an optical recording medium.

12. The aberration correcting unit according to claim 11, wherein the second corrector is configured to correct the aberration of the light beam reflected from the optical recording medium and to divide the reflected light beam into two light beams.

13. The aberration correcting unit according to claim 11, wherein the second corrector is configured to correct the aberration of the light beam reflected from the optical recording medium and to divide the reflected light beam into four light beams.

14. An optical pickup reading or writing bits of information from or onto an optical recording medium by radiating a light beam onto the optical recording medium and receiving the light beam reflected from the optical recording medium, comprising:

a first corrector configured to correct an aberration of the light beam radiated onto the optical recording medium; and a second corrector configured to correct an aberration of the light beam reflected from the optical recording medium and to divide the reflected light beam into a plurality of light beams.

15. An aberration correcting method for correcting an aberration of a light beam radiated onto an object to be detected and then reflected from the object, the method comprising the steps of:

driving a first driver;

first correcting the aberration of the light beam radiated onto the object by using the first driver that has been driven;

driving a second driver; and second correcting the aberration of the light beam reflected from the object and to divide the reflected light beam into a plurality of light beams by using the second driver that has been driven.

* * * * *